(12) United States Patent
Mabuchi et al.

(10) Patent No.: US 9,331,536 B2
(45) Date of Patent: May 3, 2016

(54) ROTATOR COIL AND METHOD OF MANUFACTURING THE SAME

(75) Inventors: Takahiro Mabuchi, Chiyoda-ku (JP); Shigeyuki Yamamoto, Chiyoda-ku (JP); Masahiro Yoshioka, Chiyoda-ku (JP); Tomohiro Kojiya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 401 days.

(21) Appl. No.: 14/110,993

(22) PCT Filed: Apr. 9, 2012

(86) PCT No.: PCT/JP2012/059634
§ 371 (c)(1),
(2), (4) Date: Oct. 10, 2013

(87) PCT Pub. No.: WO2012/144361
PCT Pub. Date: Oct. 26, 2012

(65) Prior Publication Data
US 2014/0028140 A1 Jan. 30, 2014

(30) Foreign Application Priority Data
Apr. 18, 2011 (JP) ................................. 2011-091815

(51) Int. Cl.
*H02K 15/12* (2006.01)
*H02K 3/30* (2006.01)
(Continued)

(52) U.S. Cl.
CPC .................. *H02K 3/30* (2013.01); *H02K 3/345* (2013.01); *H02K 15/105* (2013.01); *Y10T 29/49009* (2015.01)

(58) Field of Classification Search
CPC .... H02K 3/30; H02K 3/345; Y10T 29/49012; Y10T 29/49009
USPC ......... 310/43, 45, 180, 214, 215; 29/596, 598
See application file for complete search history.

(56) References Cited

U.S. PATENT DOCUMENTS 4,356,417 A * 10/1982 Smith .................... C08G 59/68
156/185
4,456,651 A * 6/1984 Pollmeier ................ H01B 3/04
427/104

(Continued)

FOREIGN PATENT DOCUMENTS

CN 1064171 A 9/1992
CN 102365310 A 2/2012

(Continued)

OTHER PUBLICATIONS

International Search Report Issued Jul. 10, 2012 in PCT/JP12/059634 Filed Apr. 9, 2012.

(Continued)

*Primary Examiner* — Thanh Lam
(74) *Attorney, Agent, or Firm* — Oblon, McClelland, Maier & Neustadt, L.L.P

(57) ABSTRACT

A rotator coil is provided that includes a coil conductor and a mica tape wound a plurality of times around an outer periphery of the coil conductor. The mica tape includes mica paper and a reinforcing member, and has an adhesive resin layer containing an acryloyl-based component and a cyanate ester-based component between the mica paper and the reinforcing members. The reinforcing member, the mica paper, or both, are impregnated with a thermosetting resin composition, and hardened.

9 Claims, 1 Drawing Sheet

(51) Int. Cl.
*H02K 3/34* (2006.01)
*H02K 15/10* (2006.01)

(56) References Cited

U.S. PATENT DOCUMENTS

| | | | | |
|---|---|---|---|---|
| 4,806,806 A | * | 2/1989 | Hjortsberg | H02K 3/32 174/120 SR |
| 5,075,159 A | * | 12/1991 | Koyama | C08G 59/3218 428/209 |
| 5,623,174 A | * | 4/1997 | Markovitz | H01B 1/24 252/510 |
| 5,982,056 A | * | 11/1999 | Koyama | C08G 59/38 310/216.001 |
| 2005/0189834 A1 | * | 9/2005 | Ikeda | H02K 3/34 310/179 |
| 2007/0222307 A1 | * | 9/2007 | Sawa | H01B 3/04 310/45 |
| 2012/0077401 A1 | | 3/2012 | Kotake et al. | |

FOREIGN PATENT DOCUMENTS

| | | |
|---|---|---|
| JP | 58 134408 | 8/1983 |
| JP | 61 266051 | 11/1986 |
| JP | 3 77203 | 4/1991 |
| JP | 6 233485 | 8/1994 |
| JP | 6-263843 A | 9/1994 |
| JP | 7 173451 | 7/1995 |
| JP | 9 279121 | 10/1997 |
| JP | 2004 203955 | 7/2004 |
| JP | 2008 228551 | 9/2008 |
| JP | 2009 112159 | 5/2009 |

OTHER PUBLICATIONS

Combined Chinese Office Action and Search Report issued Jul. 3, 2015 in Patent Application No. 201280018833.X (with English Translation and English Translation of Category of Cited Documents).

* cited by examiner

ROTATOR COIL AND METHOD OF MANUFACTURING THE SAME

TECHNICAL FIELD

The present invention relates to a coil used for a rotator, and a method of manufacturing the coil. More specifically, the present invention relates to a rotator coil for a vehicle and the like that has an insulation part excellent in heat resistance, and a method of manufacturing the rotator coil.

BACKGROUND ART

The insulating material of a stator coil of a rotator is obtained by winding a mica tape made of mica, a reinforcing member and a small amount of resin component for bonding the mica and the reinforcing member together around a coil conductor formed by binding a plurality of insulation-coated electric wires, and impregnating the resultant with a thermosetting resin composition, which is then hardened by heating.

In recent years, there have been increasing requests for a rotator to be reduced in size, increased in performance and improved in reliability, which causes concerns about dielectric breakdown and the like during operation. Accordingly, the insulating materials for such rotators are required to have reliability so as to be excellent in both of the physical stability and the chemical stability in a relatively higher temperature region of 200° C. or higher. In particular, there is a strong demand for an insulating material of a rotator coil for a vehicle that fulfils a required insulation function even under severe temperature conditions.

One conceivable method of obtaining a coil insulation material having high heat resistance is a method of blending a chemically highly resistant composition into a thermosetting resin composition used for impregnation. For example, there may be a method of adding a maleimide compound, an isocyanuric acid compound or the like that is a high heat-resistant compound to a bisphenol A-type epoxy resin that is a general-purpose impregnating resin material (PTD 1: Japanese Patent Laying-Open No. 2009-112159).

However, in the state where only the heat resistance of the thermosetting resin composition is improved, when a rotator is used at an elevated temperature of 200° C. or higher, dielectric breakdown may occur in a coil insulation material portion within 20,000 hours that is an indicator of a heat-resistant life.

As a result of reviewing several factors of dielectric breakdown described above, we have found that an impregnating resin (a hardened material of the thermosetting resin composition) is thermally decomposed and generates gas while deteriorating at a relatively high temperature, thereby decreasing the adhesiveness between the mica and the impregnating resin and causing peeling-off at this portion, with the result that dielectric breakdown occurs. Accordingly, in order to ensure the long-term reliability of coil insulation, it is necessary to increase the heat resistance of the impregnating resin and also improve the adhesiveness between the mica and the impregnating resin.

In PTD 1, the heat resistance of the coil insulation material is improved by using a thermosetting resin composition obtained by blending high heat-resistant bismaleimide and the like into an epoxy resin. However, since bismaleimide is lower in adhesiveness to mica than an epoxy resin, mica paper 7 and a reinforcing member 6 are peeled-off from each other during the operation of the rotator. Thus, the heat resistance of the coil insulation material cannot be sufficiently improved (see FIG. 3).

Furthermore, the adhesiveness between the mica and the impregnating resin can be improved by blending an acrylic resin and the like excellent in adhesiveness into a thermosetting resin composition. In this case, however, it is necessary to increase the concentration of the added acrylic resin and the like, which may cause an adverse effect on the heat resistance and the electrical property.

CITATION LIST

Patent Document

PTD 1: Japanese Patent Laying-Open No. 2009-112159

SUMMARY OF INVENTION

Technical Problem

An object of the present invention is to provide a method of manufacturing a rotator coil including an insulating material that has high heat resistance and is excellent in long-term reliability.

Solution to Problem

The present invention provides a rotator coil including a coil conductor and a mica tape wound a plurality of times around an outer periphery of the coil conductor. The mica tape includes mica paper and a reinforcing member, and has an adhesive resin layer containing an acryloyl-based component and a cyanate ester-based component between the mica paper and the reinforcing member. Furthermore, the reinforcing member and/or the mica paper are/is impregnated with a thermosetting resin composition and hardened.

It is preferable that the acryloyl-based component is made of a compound having 2 to 6 acryloyl groups in one molecule.

It is preferable that the cyanate ester-based component is made of a compound having 2 to 6 cyanate ester groups in one molecule.

It is preferable that a weight ratio between the acryloyl-based component and the cyanate ester-based component included in the adhesive resin layer is 25:75 to 70:30.

It is preferable that the thermosetting resin composition is made of an epoxy resin having at least two epoxy groups in one molecule and having an average molecular weight of 1000 or less; a phenoxy resin; a polymaleimide compound having at least two or more maleimide groups in one molecule; and acid anhydride.

It is preferable that the rotator coil is used for a vehicle.

Furthermore, the present invention provides a method of manufacturing a rotator coil. The method includes: a winding step of winding a mica tape including mica paper and a reinforcing member around a coil conductor; and an impregnating and hardening step of impregnating the reinforcing member and/or the mica paper of the mica tape with a thermosetting resin composition, and hardening the thermosetting resin composition by heating.

The thermosetting resin composition is made of an epoxy resin containing at least two epoxy groups in one molecule and having an average molecular weight of 1000 or less, a phenoxy resin, a polymaleimide compound containing at least two or more maleimide groups in one molecule, and acid anhydride.

The mica tape is configured such that an adhesive resin layer containing an acryloyl-based component made of a compound having 2 to 6 acryloyl groups in one molecule and a cyanate ester-based component made of a compound having 2 to 6 cyanate ester groups in one molecule is formed in advance between the mica paper and the reinforcing member.

It is preferable that a total weight of the thermosetting resin composition is 3 to 40 percent by weight with respect to a gross weight of the mica tape.

Advantageous Effects of Invention

According to the present invention, a resin layer having a specific composition is provided in a mica tape, thereby improving the adhesiveness between the mica paper and the impregnating resin when the impregnating resin with which the mica tape is impregnated is integrated with the mica paper, and also suppressing peeling-off of the mica paper and the reinforcing member. Consequently, it becomes possible to achieve a rotator coil that has high heat resistance and is excellent in long-term reliability.

DESCRIPTION OF EMBODIMENTS

Figure 1:
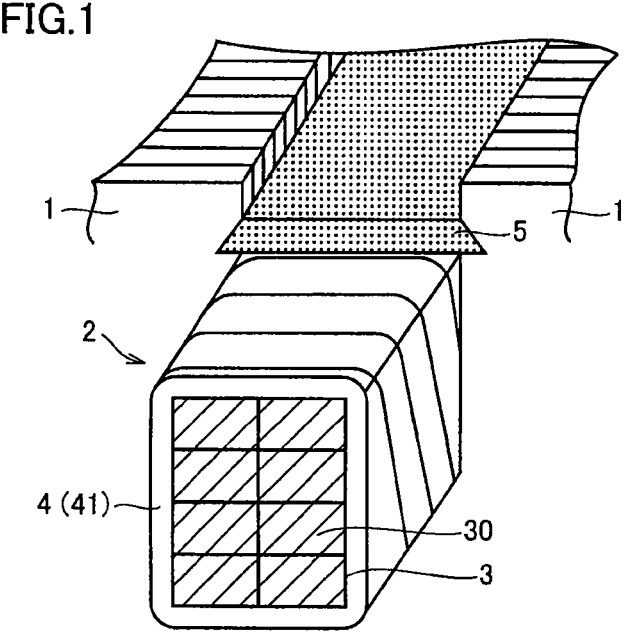
FIG. 1 is a schematic diagram showing an example of a rotator coil of the present invention.

One example of a rotator coil according to the present invention will be hereinafter schematically described with reference to FIG. 1. A stator coil 2 is housed in a slot provided in a stator core 1, and the end of stator coil 2 is drawn to the outside of the slot. This stator coil 2 has a coil conductor (wire bundle) 3 obtained by binding a plurality of insulation-coated wire conductors 30, and an insulating layer 41 is provided on the outer periphery of this coil conductor 3, to form an electrically-insulating ring 4. A wedge 5 serves as a coil holding member for preventing stator coil 2 from protruding from the slot.

Insulating layer 41 serves to electrically insulate coil conductor 3 from stator core 1, and is formed by winding a plurality of turns of a mica tape having an excellent partial discharge resistance property around the outer periphery of coil conductor 3 such that the mica tape partially overlaps itself. Insulating layer 41 also includes an impregnating resin. For convenience of illustration, FIG. 1 shows that the number of times the mica tape is wound is less than that in the actual case.

In this way, the rotator coil according to the present invention includes at least a coil conductor, and a mica tape wound a plurality of times around the outer periphery of the coil conductor.

The present invention is characterized in that a mica tape includes mica paper and a reinforcing member, and has an adhesive resin layer containing an acryloyl-based component and a cyanate ester-based component between the mica paper and the reinforcing member.

The mica paper may be uncalcined soft mica paper, uncalcined hard mica paper, calcined hard mica paper, calcined soft mica paper, synthetic mica, or aramid-mixed mica.

The reinforcing member is bonded onto the mica paper to reinforce the mica paper. The reinforcing member may be, for example, a glass fiber, an aramid fiber, and aramid-mixed paper, or a film made of polyamide-imide, polyester, polyimide ether, polyetheretherketone, polyethersulfone, polyparabanic acid, polysulfide, polyimide, or the like. Among them, it is preferable to employ a glass fiber or a polyimide film in terms of heat resistance.

The shape of the mica tape is not limited to a tape-like shape, but may be any shape such as a sheet-like shape. The number of times the mica tape is wound around the coil conductor can be set optionally in accordance with the specification and design of the rotator coil.

Figure 2:
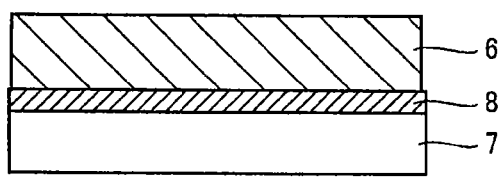
FIG. 2 is a conceptual diagram showing the cross section of a mica tape in the rotator coil of the present invention.
Figure 3:
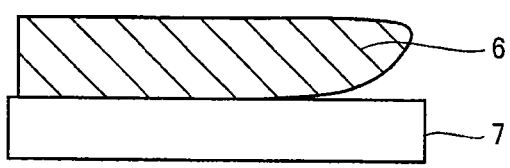
FIG. 3 is a conceptual diagram showing the cross section of a mica tape in a conventional rotator coil.

According to the present invention, in order to improve the adhesiveness between this mica paper of the mica tape and the impregnating resin integrated therewith in the subsequent process, an adhesive resin layer 8 containing an acryloyl-based component and a cyanate ester-based component is formed between mica paper 7 and a reinforcing member 6 (see FIG. 2). In addition, the adhesive resin layer may be partially included in mica paper 7.

The adhesive resin layer is a layer made of a hardened material of the adhesive resin composition containing the above-mentioned acryloyl-based component and the above-mentioned cyanate ester-based component. Thus, this adhesive resin layer is excellent in adhesiveness to the mica paper and adhesiveness to the impregnating resin. It is believed that the adhesive resin layer has an acryloyl group and a cyanate ester group, and therefore, the intermolecular force between these functional groups and water molecules existing on the surface of the mica allows improvement in adhesiveness to mica. Furthermore, since the adhesive resin layer and the impregnating resin each are resin, the adhesiveness therebetween is relatively high.

It is preferable that the acryloyl-based component is made of a compound having 2 to 6 acryloyl groups in one molecule. It is also preferable that the cyanate ester-based component is made of a compound having 2 to 6 cyanate ester groups in one molecule. The reason why the number of functional groups (an acryloyl group or a cyanate ester group) is 2 to 6 in one molecule is because less than 2 functional groups cannot form a polymer network structure during hardening, with the result that the adhesiveness between the mica and the impregnating resin cannot be improved. Also, seven or more functional groups cause many cross-linking points during hardening, thereby rendering the hardened material brittle, with the result that the required physical properties cannot be developed.

When the above-described adhesive resin layer comes into contact with the thermosetting resin composition with which the reinforcing member and the mica paper are impregnated in the subsequent process, the adhesive resin layer is compatible and reacts with this thermosetting resin composition, and becomes integrated therewith while exhibiting high adhesiveness between the surface of the mica paper and the impregnating resin (the hardened material of the thermosetting resin composition).

Examples of the "compound having 2 to 6 acryloyl groups in one molecule" forming the above-mentioned acryloyl-based component may be 1,3-butylene glycol di(meth)acrylate; 1,4-butanediol di(meth)acrylate; 1,6-hexadiol di(meth)acrylate; 1,9-nonanediol di(meth)acrylate; neopentyl glycol di(meth)acrylate; dicyclopentanyl di(meth)acrylate; 2-ethyl-2-butyl-propanediol (meth)acrylate; neopentyl glycol-modified trimethylolpropane di(meth)acrylate; stearic acid-modified pentaerythritol diacrylate; pentaerythritol triacrylate; polypropylene glycol di(meth)acrylate; 2,2-bis(4-(meth)acryloxy diethoxy-phenyl)propane; 2,2-bis(4-(meth)acryloxy propoxyphenyl)propane; 2,2-bis(4-(meth)acryloxy tetraethoxyphenyl)propane; trimethylolpropane tri(meth)acrylate; tris[(meth)acryloxyethyl isocyanurate; dimethylol propane tetra(meth)acrylate; pentaerythritol tetra(meth)acrylate; pentaerythritol ethoxy tetra(meth)acrylate; dipentaerythritol penta(meth)acrylate; dipentaerythritol hexa(meth)acrylate; and the like. One of these compounds may be used alone, or two or more of these compounds may be used in combination.

Examples of the "compound having 2 to 6 cyanate ester groups in one molecule" forming the above-mentioned cyanate ester-based component may be bis(4-cyanatophenyl) ethane, 2,2-bis(4-cyanatophenyl)propane; 2,2-bis(3,5-dimethyl-4-cyanatophenyl)methane; 2,2-bis(4-cyanatophenyl)-1,1,1,3,3,3-hexafluoropropane, α,α'-bis(4-cyanatophenyl)-m-diisopropylbenzene; and the like. One of these compounds may be used alone, or two or more of these compounds may be used in combination.

Examples of the method of forming an adhesive resin layer between the mica paper and the reinforcing member may include, but is not limited to, a method of directly applying an adhesive resin composition containing the above-mentioned acryloyl-based component and the above-mentioned cyanate ester-based component onto the surface of the mica paper with a roller, a spray or the like; and a method of applying the adhesive resin composition between the mica paper and the reinforcing member when bonding the mica paper and the reinforcing member together.

The weight ratio between the acryloyl-based component and the cyanate ester-based component contained in the adhesive resin layer (or the adhesive resin composition) is preferably 25:75 to 70:30 in terms of compatibility between the adhesive resin composition and the thermosetting resin composition, heat resistance of the impregnating resin (thermally-hardened material of the thermosetting resin composition), and adhesiveness between the adhesive resin layer and the mica paper. When the acryloyl-based component is less than 25, the adhesiveness between the mica paper and the adhesive resin layer cannot be sufficiently achieved, so that peeling-off of the mica paper and the impregnating resin cannot be suppressed. Also, when the cyanate ester-based component is less than 30, the heat resistance of the thermally-hardened material obtained by mixing the impregnating resin and the adhesive resin composition is lowered, thereby accelerating occurrence of thermal decomposition. This results in a decrease in adhesiveness to the mica paper, so that peeling-off of the mica paper and the impregnating resin cannot be suppressed.

Furthermore, it is preferable that the total weight of the thermosetting resin composition with which the reinforcing member and/or the mica paper of the mica tape are/is impregnated is 3 to 40 percent by weight with respect to the gross weight of the mica tape (mica paper, a reinforcing member and an adhesive resin layer). If the total weight of the thermosetting resin composition is less than 3 percent by weight, the effect of improving the adhesiveness between the mica paper and the impregnating resin cannot be sufficiently achieved. If the total weight of the thermosetting resin composition is greater than 40 percent by weight, it becomes difficult to impregnate the reinforcing member and the mica paper of the mica tape with the thermosetting resin composition.

Examples of the method of impregnating the reinforcing member and the mica paper of the mica tape wound around the surface of the coil conductor with the thermosetting resin composition may be a method of immersing the coil conductor having the mica tape wound therearound in the thermosetting resin composition described below in the state where this coil conductor is housed in the predetermined position of the iron core; and a method of directly immersing the coil conductor having the mica tape wound therearound in the thermosetting resin composition. By carrying out decompression or pressurization during impregnation, the time required for impregnation can be reduced.

Then, by heating the mica tape and the thermosetting resin composition, the thermosetting resin composition can be hardened.

It is preferable that the thermosetting resin composition is made of an epoxy resin containing at least two epoxy groups in one molecule and having an average molecular weight of 1000 or less; a phenoxy resin; a polymaleimide compound containing at least two or more maleimide groups in one molecule; and acid anhydride.

The epoxy resin has an average molecular weight of 1000 or less, and preferably, 500 or less. The average molecular weight of greater than 1000 is not preferable since this increases the inter-crosslinkage distance, thereby lowering the mechanical strength. Examples of the "epoxy resin containing at least two epoxy groups in one molecule and having an average molecular weight of 1000 or less" may be, but not limited to, bisphenol A diglycidyl ether; bisphenol F diglycidyl ether; epoxidized phenol novolac; a glycidyl-ester compound obtained from phthalic acid, hexahydrophthalic acid or the like and epichlorohydrin; an epoxy resin obtained from aromatic amine such as aminophenol, diaminodiphenylmethane or the like, and epichlorohydrin; a cyclic aliphatic epoxy resin obtained from dicyclopentadiene or the like and peracetic acid; 1,4-butanediol diglycidyl ether; 1,6-hexanediol diglycidyl ether; and the like. Examples of the commercially available product of bisphenol A diglycidyl ether may be Epicoat 827, Epicoat 828, Epicoat 834, Epicoat 825, and the like manufactured by Japan Epoxy Resin Co. Ltd.

It is preferable that the blending ratio of phenoxy resin is 0.1 to 5 parts by weight when the total weight of the epoxy resin and the polymaleimide compound is 100 parts by weight. When the blending ratio is less than 0.1 parts by weight, the effects of providing flexibility and improving adhesiveness cannot be achieved. When the blending ratio exceeds 5 parts by weight, the initial viscosity of the resin composition is excessively increased, thereby deteriorating the workability. Thus, the case is not preferable for an impregnating resin.

The average molecular weight of the polymaleimide compound is preferably 250 to 1500, and more preferably, 350 to 1000. When the average molecular weight is less than 250, the hardening shrinkage is increased, which causes cracking. Also, when the average molecular weight is greater than 1500, the melt viscosity is increased, with the result that the workability tends to deteriorate. Examples of the "polymaleimide compound containing at least two or more maleimide groups in one molecule" may be, but not limited to, 1-methyl-2,4-bismaleimide benzene; N,N'-m-phenylene bismaleimide; N,N'-p-phenylene bismaleimide; N,N'-m-toluylene bismaleimide; N,N'-4,4'-biphenylene bismaleimide; N,N'-4,4'-[3,3'-dimethylbiphenylene]bismaleimide; N,N'-4,4'[3,3'-dimethyldiphenylmethane]bismaleimide; N,N'-4,4'[3,3'-diethyldiphenylmethane]bismaleimide; N,N'-4,4'-diphenylmethanebismaleimide; N,N'-4,4'- diphenylpropanebismaleimide; N,N'-4,4'-diphenyletherbismaleimide; N,N'-3,3'-diphenylsulfonebismaleimide; N,N'-4,4'-diphenylsulfonebismaleimide; 2,2-bis[4-(4-maleimide phenoxy)phenyl]propane; 2,2-bis[3-t-butyl-4-(4-maleimide phenoxy)phenyl]propane; 2,2-bis[3-s-butyl-4-(4-maleimide phenoxy)phenyl]propane; 1,1-bis[4-(4-maleimide phenoxy)phenyl]decane; 1,1-bis[2-methyl-4-(4-maleimide phenoxy)-5-t-butylphenyl]-2-methylpropane; 4,4'-cyclohexylidene-bis[1-(4-maleimide phenoxy)-2-(1,1-dimethylethyl)benzene]; 4,4'-methylene-bis[1-(4-maleimide phenoxy)-2,6-bis(1,1-dimethylethyl)benzene]; 4,4'-methylene-bis[1-(4-maleimide phenoxy)-2,6-di-s-butylbenzene]; 4,4'-cyclohexylidene-bis[1-(4-maleimide phenoxy)-2-cyclohexylbenzene; 4,4'-methylene-bis[1-(maleimide phenoxy)-2-nonylbenzene]; 4,4'-(1-methylethylidene)-bis[1-(maleimide phenoxy)-2,6-bis(1,1-dimethylethyl)benzene]; 4,4'-(2-ethylhexylidene)-bis[1-(maleimide phenoxy)-benzene]; 4,4'-(1-methylheptylidene)-bis[1-(maleimide phenoxy)-benzene]; 4,4'-cyclohexylidene-bis[1-(maleimide phenoxy)-3-methylbenzene]; 2,2-bis[4-(4-maleimide phenoxy)phenyl]propane; 2,2-bis[4-(4-maleimide phenoxy)phenyl]hexafluoropropane; 2,2-bis[3-methyl-4-(4-maleimide phenoxy)phenyl]propane; 2,2-bis[3-methyl-4-(4-maleimide phenoxy)phenyl]hexafluoropropane; 2,2-bis[3,5-dimethyl-4-(4-maleimide phenoxy)phenyl]propane; 2,2-bis[3,5-dimethyl-4-(4-maleimide phenoxy)phenyl]hexafluoropropane; 2,2-bis[3-ethyl-4-(4-maleimide phenoxy)phenyl]propane; 2,2-bis[3-ethyl-4-(4-maleimide phenoxy)phenyl]hexafluoropropane; bis[3-methyl-4-(4-maleimide phenoxy)phenyl]methane; bis[3,5-dimethyl-4-(4-maleimide phenoxy)phenyl]methane; bis[3-ethyl-4-(4-maleimide phenoxy)phenyl]methane; 3,8-bis[4-(4-maleimide phenoxy)phenyl]-tricyclo-[5.2.1.02,6]decane; 4,8-bis[4-(4-maleimide phenoxy)phenyl]tricyclo-[5.2.1.02,6]decane; 3,9-bis[4-(4-maleimide phenoxy)phenyl]tricyclo-[5.2.1.02,6]decane; 4,9-bis[4-(4-maleimide phenoxy)phenyl]-tricyclo-[5.2.1.02,6]decane; 1,8-bis[4-(4-maleimide phenoxy)phenyl]menthane; 1,8-bis[3-methyl-4-(4-maleimide phenoxy)phenyl]menthane; 1,8-bis[3,5-dimethyl-4-(4-maleimide phenoxy)phenyl]menthane; N,N'-m-phenylene bismaleimide; N,N'-p-phenylene bismaleimide; N,N'-(4,4'-diphenylmethane)bismaleimide; N,N'-(4,4'-diphenyl ether) bismaleimide; N,N'-(4,4'diphenylsulfone)bismaleimide; N,N'-(4,4'-dicyclohexyl-methane)bismaleimide; N,N'-(4,4'-diphenylcyclohexane)bismaleimide; N,N'-(4,4'-triphenylmethane)bismaleimide; 2,2'-bis[4-(4-maleimide phenoxy)phenyl]propane; N,N'-(2,2'-diethyl-6,6'-dimethyl-4,4'-methylenediphenylmethane)bismaleimide, bis-(3-ethyl-5-methyl-4-maleimide phenyl)methane; and the like.

Acid anhydride is not particularly limited as long as it is general acid anhydride, and may be, for example, methylhexahydrophthalic anhydride; hexahydrophthalic anhydride; methyltetrahydrophthalic anhydride; tetrahydrophthalic anhydride; nadic anhydride; methyl nadic anhydride; dodecyl succinic anhydride; succinic anhydride; octadecyl succinic anhydride; maleic anhydride; benzophenone tetracarboxylic anhydride; and the like. These acid anhydrides mentioned above may be used alone or may be used as a mixture thereof. Among them, it is preferable to contain, but not limited to, nadic anhydride or methyl nadic anhydride in terms of heat resistance.

When acid anhydride is in a liquid state (for example, methyltetrahydrophthalic anhydride), the blending ratio of acid anhydride is preferably 20 to 150 parts by weight with respect to 100 parts by weight of imide ring-containing epoxy compound, and more preferably, 40 to 130 parts by weight. If the blending ratio of acid anhydride is less than 20 parts by weight, the hardened material tends to be brittle. If the blending ratio of acid anhydride exceeds 150 parts by weight, the heat resistance of the hardened material tends to decrease. It is to be noted that the term "liquid state" used herein means that the object is liquid at room temperature.

To the thermosetting resin composition, as required, a radical initiator may be added for the purpose of accelerating polymerization, or a catalyst capable of facilitating the reaction between an epoxy resin and a liquid-state acid anhydride may be added.

Examples of the radical initiator may be peroxide such as benzoyl peroxide, diisopropyl peroxycarbonate, lauroyl peroxide, dicumyl peroxide, t-butylperoxy pivalate; and an azo compound such as azoisobutyronitrile, 2,2'-azobis(2-methylbutyronitrile).

Examples of the catalyst may be tertiary amines such as tri-n-butylamine and tris(dimethylaminomethyl)phenol; salts of these tertiary amines; imidazoles such as 2-methylimidazole and 2-ethyl-4-methylimidazole; and a phosphine-based derivative such as triphenylphosphine and tri-n-butylphosphine.

EXAMPLES

The present invention will be hereinafter described based on examples, but is not limited only to such examples.

Examples 1 to 5 and Comparative Examples 1 to 4

On the surface of the mica tape made of uncalcined soft mica paper and a reinforcing member (glass fiber), an adhesive resin composition made of BADCY (manufactured by Huntsman Corporation) that is a cyanate ester component and A-TMM-3 (manufactured by Shin-Nakamura Chemical Co., Ltd.) that is an acroyl component (the weight ratio between BADCY and A-TMM-3 was 75:25) was applied. The mica tape having this adhesive resin composition applied thereon was wound around the conductor three times, which was then immersed for 5 hours in a thermosetting resin composition made of each composition shown in Table 1. It is to be noted that the numerical values in Table 1 each show a value in terms of a part by weight of each component assuming that the weight of mica is 100 parts by weight.

Then, by heating at 130° C. for 3 hours and at 200° C. for 5 hours, the thermosetting resin composition was thermally hardened, thereby obtaining a coil. The obtained coils (Examples 1 to 5 and Comparative Examples 1 to 4) were evaluated by the following methods.

Assuming that a heating and moisture absorption test conducted under the conditions at 280° C. for 24 hours, then at 40° C. for 24 hours and at RH95% was set as one cycle, ten cycles of tests were conducted. Then, the value of a dielectric loss tangent (tan δ) was evaluated as A when it was less than three times the value of an initial tan δ; evaluated as B when it was equal to or greater than three times and less than five times the value of initial tan δ; and evaluated as C when it was equal to or greater than five times the value of initial tan δ. Furthermore, an insulating portion was cut out from the coil, and the section of this insulating portion was observed by a microscope, to confirm whether peeling-off of the mica and the resin occurred or not. The evaluation results are shown in Table 1.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Mica Tape | Mica (Soft Mica Paper) | 100 | 100 | 100 | 100 | 100 | 100 | 100 | 100 | 100 |
| | Reinforcing Member (Glass Fiber) | 30 | 30 | 30 | 30 | 30 | 30 | 30 | 30 | 30 |
| | Adhesive Resin Layer BADCY | 20 | 20 | 30 | 12 | 2 | 20 | 20 | 25 | 0.5 |
| | A-TMM-3 | 20 | 20 | 10 | 28 | 2 | 20 | 20 | 25 | 0.5 |
| Impregnating Resin | Epoxy Resin (JER828) | 50 | 50 | 50 | 50 | 50 | 50 | 50 | 50 | 50 |
| | Phenoxy Resin (YP50S) | 2 | 5 | 5 | 5 | 5 | 0 | 10 | 2 | 2 |
| | Maleimide Compound (BMI) | 23 | 20 | 20 | 20 | 20 | 23 | 20 | 23 | 23 |
| | Acid Anhydride (HN2000) | 25 | 25 | 25 | 25 | 25 | 25 | 30 | 25 | 25 |
| Occurrence or Non-Occurrence of Peeling-Off | | Not Occurred | Not Occurred | Not Occurred | Not Occurred | Not Occurred | Occurred | Occurred | Occurred | Occurred |
| Evaluation of tanδ | | A | A | A | A | A | C | B | C | B |

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 stator core, 2 stator coil, 3 coil conductor (wire bundle), 30 wire conductor, 4 electrically-insulating ring, 41 insulating layer, 5 wedge, 6 reinforcing member, 7 mica paper, 8 adhesive resin layer.

The invention claimed is:

1. A rotator coil comprising a coil conductor and a mica tape wound a plurality of times around an outer periphery of the coil conductor,
   wherein the mica tape comprises
   mica paper, a reinforcing member, and an adhesive resin layer comprising an acryloyl-based component and a cyanate ester-based component between the mica paper and the reinforcing member,
   the reinforcing member, the mica paper, or both are impregnated with a thermosetting resin composition and hardened,
   the thermosetting resin composition comprises an epoxy resin, a phenoxy resin and a polymaleimide compound, and
   an amount of the phenoxy resin is from 0.1 to 5 parts by weight when a total weight of the epoxy resin and the polymaleimide compound is 100 parts by weight.

2. The rotator coil according to claim 1, wherein the acryloyl-based component is made of a compound having 2 to 6 acryloyl groups in one molecule.

3. The rotator coil according to claim 1, wherein the cyanate ester-based component is made of a compound having 2 to 6 cyanate ester groups in one molecule.

4. The rotator coil according to claim 1, wherein a weight ratio between the acryloyl-based component and the cyanate ester-based component in the adhesive resin layer is from 25:75 to 70:30.

5. The rotator coil according to claim 1, wherein the thermosetting resin composition is made of:
   an epoxy resin having at least two epoxy groups in one molecule and having an average molecular weight of 1000 or less;
   a phenoxy resin;
   a polymaleimide compound having at least two or more maleimide groups in one molecule; and
   acid anhydride.

6. The rotator coil according to claim 1, wherein the rotator coil is suitable for a vehicle.

7. A method of manufacturing a rotator coil, comprising:
   winding a mica tape comprising mica paper and a reinforcing member around a coil conductor;
   impregnating the reinforcing member, the mica paper, or both of the mica tape with a thermosetting resin composition;
   and hardening the thermosetting resin composition by heating,
   wherein
   the thermosetting resin composition is made of:
   an epoxy resin comprising at least two epoxy groups in one molecule and having an average molecular weight of 1000 or less;
   a phenoxy resin;
   a polymaleimide compound comprising at least two or more maleimide groups in one molecule; and
   acid anhydride, and
   the mica tape is configured such that an adhesive resin layer comprising an acryloyl-based component made of a compound having 2 to 6 acryloyl groups in one molecule and a cyanate ester-based component made of a compound having 2 to 6 cyanate ester groups in one molecule is formed in advance between the mica paper and the reinforcing member.

8. The method according to claim 7, wherein a total weight of the thermosetting resin composition is from 3 to 40 percent by weight with respect to a gross weight of the mica tape.

9. The rotator coil according to claim 1, wherein an amount of the adhesive resin layer is from 4 to 40 parts by weight when an amount of the mica paper is 100 parts by weight.

* * * * *